US008392966B2

(12) United States Patent
Fifer et al.

(10) Patent No.: US 8,392,966 B2
(45) Date of Patent: Mar. 5, 2013

(54) LIMITING THE AVAILABILITY OF COMPUTATIONAL RESOURCES TO A DEVICE TO STIMULATE A USER OF THE DEVICE TO APPLY NECESSARY UPDATES

(75) Inventors: Nicholas Duane Fifer, New York, NY (US); Ilan Gayda, Netanya (IL); Itzhack Goldberg, Hadera (IL); Boaz Mizrachi, Haifa (IL); Uri Silbershtein, Mazkert Batia (IL)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 12/349,463

(22) Filed: Jan. 6, 2009

(65) Prior Publication Data
US 2010/0175068 A1 Jul. 8, 2010

(51) Int. Cl.
H04L 29/06 (2006.01)
(52) U.S. Cl. .......................................... 726/2
(58) Field of Classification Search ................ None
See application file for complete search history.

(56) References Cited

U.S. PATENT DOCUMENTS

| | | | |
|---|---|---|---|
| 7,043,629 B1 | 5/2006 | Taraz | |
| 7,149,889 B2 | 12/2006 | Stalker et al. | |
| 7,366,985 B1 | 4/2008 | McKeeth | |
| 8,065,712 B1 * | 11/2011 | Cheng et al. | 726/1 |
| 8,079,068 B2 * | 12/2011 | Adams | 726/9 |
| 8,176,564 B2 * | 5/2012 | Frank et al. | 726/27 |
| 2005/0223302 A1 | 10/2005 | Bono | |
| 2005/0246767 A1 * | 11/2005 | Fazal et al. | 726/11 |
| 2006/0294580 A1 * | 12/2006 | Yeh | 726/3 |
| 2007/0028296 A1 | 2/2007 | Wachtler et al. | |
| 2007/0061372 A1 | 3/2007 | Appavoo et al. | |
| 2007/0168725 A1 | 7/2007 | Lee | |
| 2007/0214215 A1 | 9/2007 | McCaleb et al. | |
| 2008/0028391 A1 | 1/2008 | Nallipogu et al. | |
| 2008/0077420 A1 | 3/2008 | Cromer et al. | |
| 2008/0104252 A1 | 5/2008 | Henniger | |
| 2008/0244724 A1 * | 10/2008 | Choe et al. | 726/12 |
| 2009/0300707 A1 * | 12/2009 | Garimella et al. | 726/1 |

OTHER PUBLICATIONS

Dyck, "High Reliability Organization (HRO) in Practice", Technical Enterprises, Inc., Technical Support, Jan. 2007, pp. 1-2.
Microsoft Corporation, "Standardizing Network Access Control: TNC and Microsoft NAP to Interoperate", Trusted Computing Group, May 2007, pp. 1-7.
Fratto, "Tutorial: Network Access Control (NAC)", Jul. 17, 2007 [retrieved online Sep. 21, 2008]http://www.networkcomputing.com/article/printFullArticleSrc.jhtml?artic....

* cited by examiner

Primary Examiner — Jacob A Petranek
(74) Attorney, Agent, or Firm — David W. Victor; Konrad Raynes Davda & Victor LLP

(57) ABSTRACT

Provided are a method, system, and article of manufacture for limiting the availability of computational resources to a device to stimulate a user of the device to apply necessary updates. Indication of the n update to the device is received and a determination is made as to whether the update has been applied to the device. The availability of computational resources at the device to use to execute processes at the device are limited in response to determining that the update has not been applied to the device. Processes are executed at the device using the limited available computational resources after the limiting of the availability of the computational resources. A determination is made as to whether the update has been applied to the device after limiting the availability of the computational resources. The limiting of the availability of the computational resources at the device is reversed in response to determining that the update to the device was applied.

19 Claims, 3 Drawing Sheets

LIMITING THE AVAILABILITY OF COMPUTATIONAL RESOURCES TO A DEVICE TO STIMULATE A USER OF THE DEVICE TO APPLY NECESSARY UPDATES

BACKGROUND OF THE INVENTION

1. Field of the Invention

The present invention relates to a method, system, and article of manufacture for limiting the availability of computational resources to a device to stimulate a user of the device to apply necessary updates.

2. Description of the Related Art

Many system and security patches to a computer system require that the user of the computer system reboot the system. An update program may prompt the user to reboot their system so that the update may be applied. Often the user may ignore notifications to reboot and continue operating without the benefit of the installation of the updates, which could leave the system vulnerable to security risks in situations were the update is to address a security vulnerability.

Certain systems provide an upper bound on how long the user may go without applying the patch to their system and upon reaching this upper bound automatically reboot the system. Automatic reboot may interrupt ongoing processes and cause the loss of data.

In a network environment, a network access control component may require that client computers apply all necessary patches before they are allowed to access the network managed by the network access control component. In a Network Access Control environment, the client system may send an enhanced router implementing network access control a list of the operating system level/patches and other relevant security attributes of the client when the client attempts to connect to the network via the router. The router may determine whether the client is compliant with the security policy of the company and, if not, either not allow the client to connect or only provide the client access to a virtual network for the purposes of downloading and installing operating system patches to bring the client up to compliance.

SUMMARY

Provided are a method, system, and article of manufacture for limiting the availability of computational resources to a device to stimulate a user of the device to apply necessary updates. Indication of the n update to the device is received and a determination is made as to whether the update has been applied to the device. The availability of computational resources at the device to use to execute processes at the device are limited in response to determining that the update has not been applied to the device. Processes are executed at the device using the limited available computational resources after the limiting of the availability of the computational resources. A determination is made as to whether the update has been applied to the device after limiting the availability of the computational resources. The limiting of the availability of the computational resources at the device is reversed in response to determining that the update to the device was applied.

DETAILED DESCRIPTION

Figure 1:
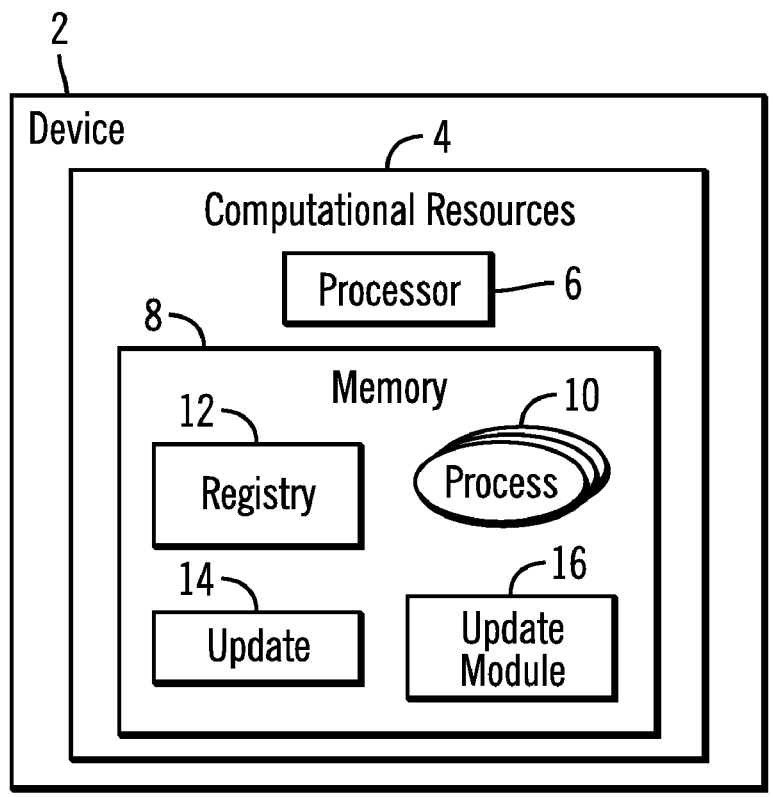
FIG. 1 illustrates an embodiment of a computing environment.

FIG. 1 illustrates an embodiment of a computing environment. A device 2 includes computational resources 4, such as a processor 6, and a memory 8. The memory 8 may store processes 10 executing tasks to perform operating system or application program operations; a registry 12 including information on installed programs, including information on installed versions and patch numbers; an update 14 comprising an update to installed programs or firmware; and an update module 16 to perform update related operations. The update 14 may comprise a patch, version upgrade, program fix, etc. with respect to programs and/or firmware of the device 2. In one embodiment, the update 14 comprises an update that requires a user to reboot or power cycle the device 2.

The device 2 may comprise a computer system (e.g., desktop, laptop, telephony device, server, etc.) that executes user applications and an operating system; a dedicated hardware device (e.g., a switch, hub, security appliance, etc.); or a storage controller managing access to attached storage (e.g., a Redundant Array of Independent Disks (RAID), one or more interconnected hard disk drives, a tape library, optical library, a Direct Access Storage Device (DASD), Just a Bunch of Disks (JBOD), etc.).

Figure 2:
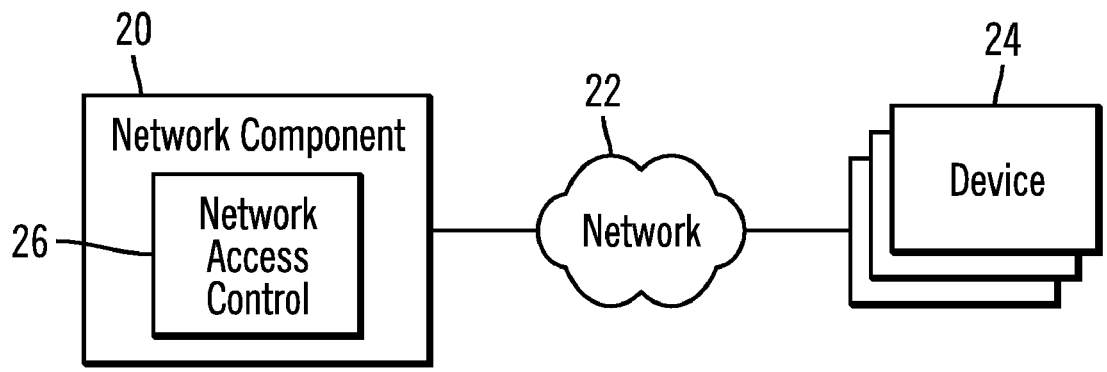
FIG. 2 illustrates an embodiment of a network computing environment.

FIG. 2 illustrates a network computing environment where a network component 20 is in communication over a network 22 with multiple devices 24, which may each comprise the device 2 in FIG. 1. The network component 20 may include network access control 26 that determines whether devices 24 attempting to access the network 22 or resources, e.g., storage, network, etc., have an appropriate access level and have a sufficient level of updates applied to the programs or firmware of the devices 24. The network access control 22 may limit or degrade device 24 access to network resources until the user of the device 24 applies the required updates or patches. The network component 20 may comprise a server, router, switch, etc.

Figure 3:
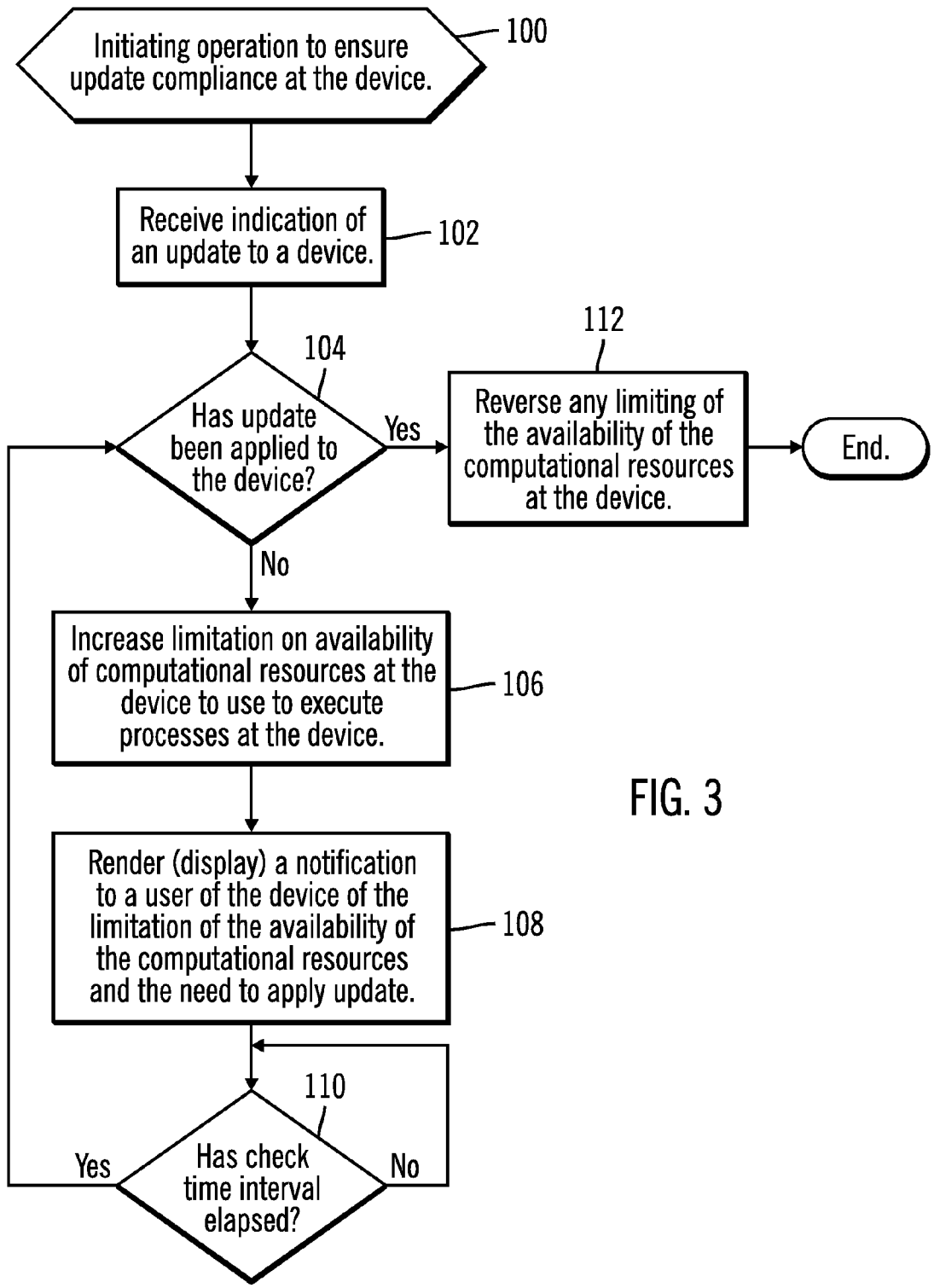
FIG. 3 illustrates an embodiment of operations to stimulate a user to apply updates to a device.

FIG. 3 illustrates an embodiment of operations performed by the update module 16 to stimulate and motivate a user, such as a direct user of the device 2 or administrator, to apply updates at the device 2. The update compliance may be specified by a network access control of a network in which the device 2 operates or may be specified by programs installed in the device 2. Upon initiating (at block 100) update compliance and in response to receiving (at block 102) indication of an update for the device 2 in which the update module 16 operates, the update module 16 determines (at block 104) whether the indicated update has been applied to the device 2. This determination may be made by checking the registry 12 database which indicates installed programs, including versions of the installation. The update module 16 may receive either an indication of an update 14 that the update module 16 needs to download or access from an external source or the indication may comprise receiving the update 14 itself.

If the indicated update 14 has not been applied, then the update module 6 renders (at block 106) a notification to a user of the device 22 of the limitation of the availability of the computational resources and the need to apply the indicated update. The rendered notification may comprise a display window that appears at a monitor (not shown) connected to the device 2 or at a user device (such as a separate computer, wireless device, telephony device, etc.) capable of rendering a display or sound notification to the user that may apply the update 14 to the device 2. The notification may comprise an audio message or some other alert, such as sending an email, cell phone call, etc. The notification may inform the user or administrator of the device 2 that performance may continue to be degraded at the device 2 until the user applies the update 14.

If the indicated update 14 has not been applied, then the update module 16 increases (at block 108) a limitation on the availability of computation resources 4 at the device 2 used to execute processes 10 at the device 22. In this way the limitation on the availability of computational resources 4 does not prevent the execution of processes 10 at the device 2, but instead delays the processing, for instance in a manner that may be discernible to users of the device 2. This limitation on the availability of resources may comprise an additional increase in the limitation of availability in response to multiple determinations at block 104 and continued failure of the user of the device 4 to apply the indicated update.

In one embodiment, limitation on availability of resources may involve limiting processor 6 and memory 4 resources that may be used by the processes 10. For instance, processor 6 resources may be divided into processor partitions that may be assigned to processes 10. In such case, limiting the availability of resources may remove certain processor 6 partitions from being available to execute the processes 10, thereby increasing the likelihood that new processes 10 will have to wait for processor 6 partitions to become available. The limiting of the availability of resources may further involve removing certain memory 8 locations from being available for use when executing processes 10, which may cause delays by requiring increased virtual memory swapping operations between the memory 8 and non-volatile memory (not shown), such as a disk drive. If the update module 16 performs additional iterations of the operations at blocks 104, 106, and 108, then the update module 16 may continue to remove or limit the availability of computational resources 4 to the point where the degradation of performance stimulates the user of the device 2 to apply the update 14.

In an alternative embodiment, the availability of computational resources 4 may be limited by inserting a sleep process to intermittently execute. This sleep process may perform no operation, other than consume computational resources 4 to remove from being available to execute processes 10 for a time period. If the update module 16 performs additional iterations of the operations at blocks 104, 106, and 108, then the update module 16 may increase the duration, frequency or instances of the sleep process to the point where the degradation of performance stimulates the user of the device 2 to apply the update 14, which may involve a reboot operation.

In one embodiment, the update module 16 may delay the operation of limiting the availability of computational resources 4 for a time period, such as a predetermined amount of time or wait until a next reboot operation, to provide the user of the device 2 time to apply the update after notifying the user of the need to apply the update before reducing performance.

After limiting the availability of computational resources 4 and after a check time interval has elapsed (at bock 110), control proceeds back to block 104 to determine if the user has acquiesced and applied the update 14 or if further curtailment of available computational resources 4 is needed to motivate the user to apply the update. In one embodiment, the user of the device 2 may need to select controls to apply the update 14, such as by clicking an update or "ok" button in a graphical user interface (GUI) panel. The device 2 may receive the update 14 to apply from a connected storage device or from a network.

If (at block 104) the update 14 has been applied, then the update module 14 reverses (at block 112) any limitation on the availability of computational resources 4 that would have been applied during prior iterations of the operations at blocks 104-110. Removing the limitations may involve making any processor 6 or memory 4 resources available to execute processes 10 that were previously removed from the pool of available resources or terminating any sleep processes spawned to delay execution processing.

In one embodiment, the update module 16 may save state information in response to a reboot operation so that the operations of FIG. 3 may continue following a reboot to continue to degrade performance until the update 14 is applied as a result of the reboot.

Figure 4:
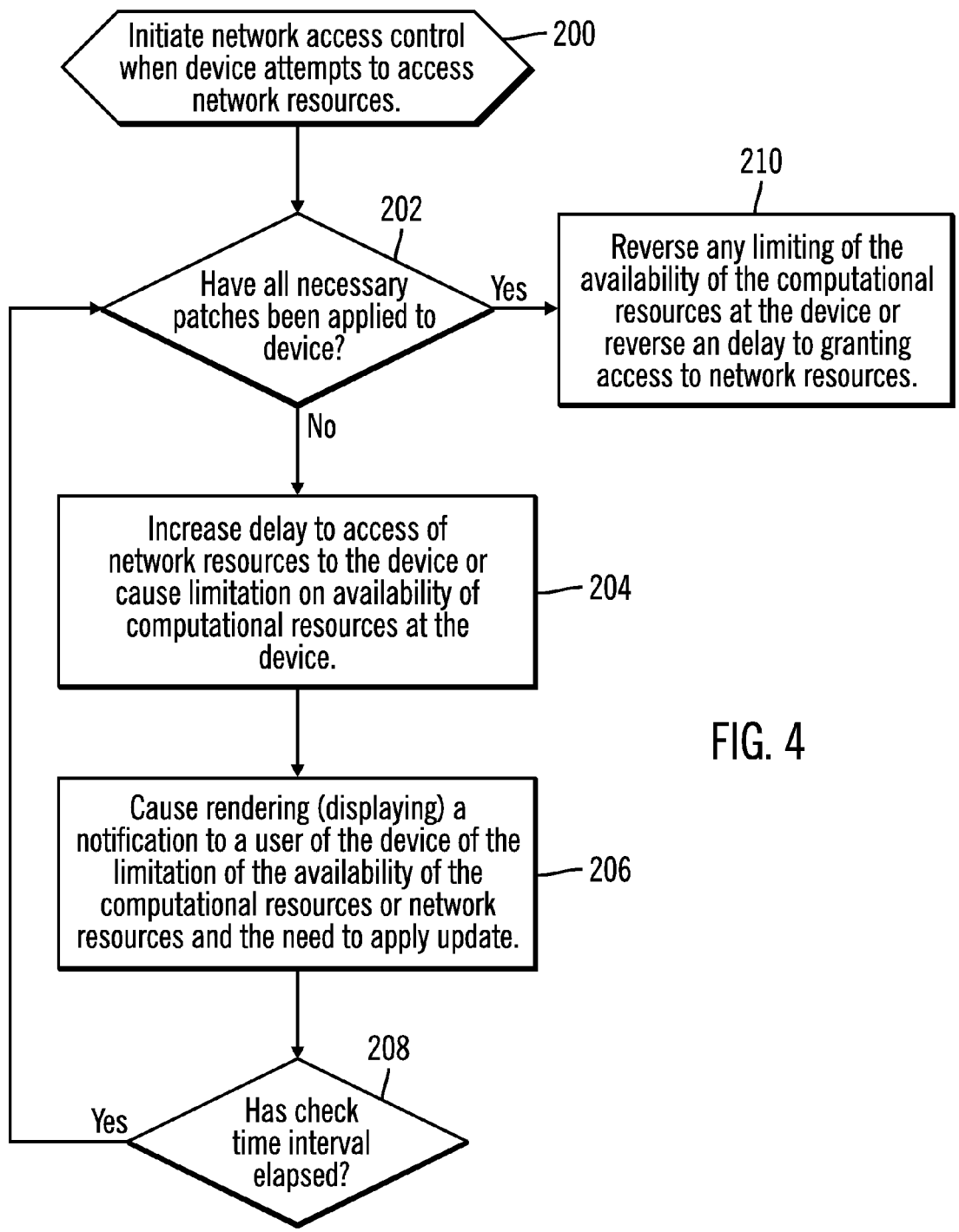
FIG. 4 illustrates an embodiment of operations to stimulate a user to apply updates to a device in a network environment.

FIG. 4 illustrates an embodiment of operations performed by the network access control 26 in the network computing environment of FIG. 2 to provide network access control of updates to devices 24. Upon initiating (at block 200) network access control when the device 24 attempts to access network resources or connect to the network 22, the network access control 26 determines (at block 202) whether all necessary patches, i.e., updates 14, have been applied to the device 24. The network access control 26 may access the registry 12 at the device or may access a local database indicating updates applied to the device 24. If the required updates have not been applied, then network access control 26 may cause the providing of notifications (at block 204), as described with respect to block 106. If the required updates have not been applied, then the network access control 26 may increase (at block 206) delays in allowing the device 24 to access network resources, such as accessing storage and server resources available over the network 22, access network resources, or may limit the availability of computational resources 4 at the requesting device 24. Still further, the network component 20 may delay responding to requests from the device 24 until the update 14 is applied. These delays and limitations may not prevent the device 24 from accessing requested resources or executing device processes 10, but instead degrade the performance of the device 24 to the point where the user is eventually stimulated to apply the update 14. If the update is applied, then (at block 210) the network access control 26 performs actions to reverse any limiting of the availability of network resources or computational resources 4 at the device 24.

In one embodiment, the network access control 26 may delay the operation of limiting the availability of computational resources 4 for a time period, such as a predetermined amount of time or wait until a next reboot operation, etc., to provide the user of the device 2 time to apply the update resources after notifying the user of the need to apply the update.

During the limitation of the availability of computational resources, the user of the device 2, 24 is still able to continue executing processes 10 under degraded performance conditions. The described embodiments seek to stimulate the user of the device 2, 24, to apply the update 14 and avoid the need to automatically update and reboot the device 4 which may cause a disruptive unplanned reboot and the loss of data.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving indication of an update to a device;
   determining whether the update has been applied to the device;
   limiting availability of computational resources at the device, including at least one of memory and processor resources, available to be assigned to execute processes at the device in response to determining that the update has not been applied to the device, wherein the limiting of the availability of the computational resources degrades performance at the device;
   executing processes at the device using the limited available computational resources after the limiting of the availability of the computational resources;
   determining whether the update has been applied to the device after limiting the availability of the computational resources; and
   reversing the limiting of the availability of the computational resources at the device in response to determining that the update to the device was applied.

2. The method of claim 1, further comprising:
rendering a notification to a user of the device of the limitation of the availability of the computational resources and the update in response to determining that the update has not been applied to the device, wherein the update to the device is applied in response to user input to cause the application of the update to the device.

3. The method of claim 2, wherein the performing of the limiting of the availability of the computational resources is delayed following the rendering of the notification to provide the user time to apply the update before performing the limiting of the availability of the computational resources.

4. The method of claim 1, wherein further limiting the availability of the computational resources comprises:
periodically determining whether the update has been applied to the device after performing the operation of limiting the availability of the computational resources;
rendering an additional notification to the user of the device that computational resources will be further limited until the user causes the application of the update to the device; and
limiting availability of additional computational resources at the device in response to determining that the update has not been applied to the device in response to the periodical determining that the update has not been applied to further reduce the computational resources available to execute processes at the device.

5. The method of claim 1, wherein processor resources are divided into processor partitions available to assign to execute processes at the device, wherein limiting the availability of computational resources comprises limiting the processor partitions available to execute the processes at the device, wherein those processor partitions unavailable to execute the processes at the device remain idle.

6. The method of claim 1, wherein limiting the availability of computational resources comprises adding a sleep process to execute between processor cycles to consume computational resources to remove from being available to execute processes in the device to delay execution of client processes at the device.

7. The method of claim 6, further comprising:
periodically determining whether the update has been applied to the device after a time period following the limitation of the availability of the computational resources; and
increasing a frequency or duration of the execution of the sleep process to increase the delay of the execution of the client processes in response to the periodical determining that the update has not been applied.

8. The method of claim 1, wherein a network component determines whether the update is applied and wherein the network component controls the device to perform the limiting of the availability of computational resources in response to determining that the update has not been applied to the device and reversing of the limiting of the availability of the computational resources at the device in response to determining that the update has been applied to the device.

9. The method of claim 1, wherein the device is a member of a set of devices comprising a client computer executing application programs, a network device, and a storage system.

10. The method of claim 1, further comprising:
increasing the limiting of the availability of the computational resources at the device in response to additional determinations that the update has not been applied.

11. A device, comprising:
a processor;
a computer readable storage medium including a program executed by the processor to perform operations, the operations comprising:
receiving indication of an update to the device;
determining whether the update has been applied to the device;
limiting availability of computational resources at the device, including at least one of memory and processor resources, available to be assigned to execute processes at the device in response to determining that the update has not been applied to the device, wherein the limiting of the availability of the computational resources degrades performance at the device;
executing processes at the device using the limited available computational resources after the limiting of the availability of the computational resources;
determining whether the update has been applied to the device after limiting the availability of the computational resources; and
reversing the limiting of the availability of the computational resources at the device in response to determining that the update to the device was applied.

12. The device of claim 11, wherein the operations further comprise:
rendering a notification to a user of the device of the limitation of the availability of the computational resources and the update in response to determining that the update has not been applied to the device, wherein the update to the device is applied in response to user input to cause the application of the update to the device.

13. The device of claim 11, wherein further limiting the availability of the computational resources comprises:
periodically determining whether the update has been applied to the device after performing the operation of limiting the availability of the computational resources;
rendering an additional notification to the user of the device that computational resources will be further limited until the user causes the application of the update to the device; and
limiting availability of additional computational resources at the device in response to determining that the update has not been applied to the device in response to the periodical determining that the update has not been applied to further reduce the computational resources available to execute processes at the device.

14. The device of claim 11, wherein the operations further comprise:
increasing the limiting of the availability of the computational resources at the device in response to additional determinations that the update has not been applied.

15. An article of manufacture comprising a non-transitory computer readable storage medium including code executed in a device to perform operations, the operations comprising:
receiving indication of an update to the device;
determining whether the update has been applied to the device;
limiting availability of computational resources at the device, including at least one of memory and processor resources, available to be assigned to execute processes at the device in response to determining that the update has not been applied to the device, wherein the limiting of the availability of the computational resources degrades performance at the device;

executing processes at the device using the limited available computational resources after the limiting of the availability of the computational resources;

determining whether the update has been applied to the device after limiting the availability of the computational resources; and reversing the limiting of the availability of the computational resources at the device in response to determining that the update to the device was applied.

16. The article of manufacture of claim 15, wherein the operations further comprise:

rendering a notification to a user of the device of the limitation of the availability of the computational resources and the update in response to determining that the update has not been applied to the device, wherein the update to the device is applied in response to user input to cause the application of the update to the device.

17. The article of manufacture of claim 15, wherein further limiting the availability of the computational resources comprises:

periodically determining whether the update has been applied to the device after performing the operation of limiting the availability of the computational resources;

rendering an additional notification to the user of the device that computational resources will be further limited until the user causes the application of the update to the device; and limiting availability of additional computational resources at the device in response to determining that the update has not been applied to the device in response to the periodical determining that the update has not been applied to further reduce the computational resources available to execute processes at the device.

18. The article of manufacture of claim 16, wherein a network component determines whether the update is applied and wherein the network component controls the device to perform the limiting of the availability of computational resources in response to determining that the update has not been applied to the device and reversing of the limiting of the availability of the computational resources at the device in response to determining that the update has been applied to the device.

19. The article of manufacture of claim 15, wherein the operations further comprise:

increasing the limiting of the availability of the computational resources at the device in response to additional determinations that the update has not been applied.

* * * * *